(12) United States Patent
Kish et al.

(10) Patent No.: US 8,702,025 B2
(45) Date of Patent: Apr. 22, 2014

(54) RETRACTABLE SPOOL WITH TWO MODES OF OPERATION FOR REWINDING A FLEXIBLE MEMBER

(76) Inventors: Louis Kish, Santa Ana, CA (US); Joe Horvath, Fullerton, CA (US)

( * ) Notice: Subject to any disclaimer, the term of this patent is extended or adjusted under 35 U.S.C. 154(b) by 755 days.

(21) Appl. No.: 12/813,480

(22) Filed: Jun. 10, 2010

(65) Prior Publication Data

US 2010/0314479 A1    Dec. 16, 2010

Related U.S. Application Data

(60) Provisional application No. 61/185,685, filed on Jun. 10, 2009.

(51) Int. Cl.
*B65H 75/48*    (2006.01)

(52) U.S. Cl.
USPC ..................................... 242/378.1; 242/385.1

(58) Field of Classification Search
USPC ............. 242/378, 378.1, 378.2, 378.3, 385.1, 242/385.3
See application file for complete search history.

(56) References Cited

U.S. PATENT DOCUMENTS

| 1,442,999 | A  | * | 1/1923  | Boyle ......................... 191/12 R |
| 6,019,304 | A  | * | 2/2000  | Skowronski et al. ......... 242/378 |
| 7,017,846 | B2 | * | 3/2006  | Tsoi et al. .................. 242/378.2 |
| 7,222,812 | B2 | * | 5/2007  | Chang et al. ............... 242/378.1 |
| 7,364,109 | B2 | * | 4/2008  | Kuo ............................ 242/378 |
| 7,784,727 | B1 | * | 8/2010  | Liao ........................... 242/378.1 |
| 2010/0314479 | A1 | * | 12/2010 | Kish et al. .................... 242/376 |

* cited by examiner

*Primary Examiner* — William A Rivera
(74) *Attorney, Agent, or Firm* — Oakwood Law Group, LLP

(57) ABSTRACT

The present invention is directed to an improved rewind apparatus for a flexible member. Specifically, the invention provides a retractable spool and a mechanism which allows a user to move a switch so that he/she has a choice of having the spool always pulling on the flexible member, a Tension mode of operation, or using a No Tension mode of operation that allows the flexible member to relax, and then, with a brief tug on the flexible member, retraction forces of a spring causes the flexible member to be wound around the spool.

16 Claims, 5 Drawing Sheets

Track arm lowered into no-tension mode

Approximate contact point to lever-rib23 on top half of enclosure

RETRACTABLE SPOOL WITH TWO MODES OF OPERATION FOR REWINDING A FLEXIBLE MEMBER

REFERENCE TO RELATED APPLICATIONS

This patent application claims the benefit of U.S. Provisional Application No. 61/185,685 filed on Jun. 10, 2009, the disclosure of which is incorporated herein in its entirety by reference.

BACKGROUND OF THE INVENTION

1. Field of the Invention

The present invention is directed to an improved rewind apparatus for a flexible member. Specifically, the invention provides a retractable spool and a mechanism which allows a user to move a switch so that he/she has a choice of having the spool always pulling on the flexible member, a Tension mode of operation, or using a No Tension mode of operation that allows the flexible member to relax, and then, with a brief tug on the flexible member, retraction forces of a spring causes the flexible member to be wound around the spool.

2. Description of Related Art

Apparatus for rewinding a flexible member such as a pet leash, tape measure, string with a writing instrument or keys is known in the prior art. More specifically, by way of example, U.S. Pat. No. 7,270,289 to Kish discloses a writing instrument holder having a substantially funnel-shaped body configured to hold concurrently a writing instrument internally and another writing instrument externally.

U.S. Pat. No. 7,131,401 to Huff, et al. discloses a retracting and locking leash housing includes a casing and a handle. A spool is rotatably disposed in the casing and includes a circle of teeth and a finger which extends from the locking portion to engage the circle of teeth when the trigger is moved to a locking position to prevent rotation of the spool.

U.S. Pat. No. 7,040,257 to Waxman, et al. discloses a retractable leash device having a housing with a leash wound around an internal reel. The reel is biased by a spring to automatically retract the leash. A lock in the housing is normally disengaged from teeth on the reel. When the lock is actuated, the reel is engaged by a ratchet to prevent rotation in the release direction but permit rotation in the retract direction.

U.S. Pat. No. 6,854,681 to Kish discloses a retractable device for retaining a writing instrument at an accessible location for an individual. The retractable device has a retractable reel coupled to a flexible member which engages the instrument. The flexible member includes a first bore and a second bore. The first bore is sized to receive a connector from the retractable reel. The second bore has a varying inner diameter which allows instruments of various sizes to be held within the flexible member.

U.S. Pat. No. 6,845,736 to Anderson discloses a spool rotatably mounted on a support and a flexible cord wound on the spool where the flexible cord has an end connected to the spool and a second end connected with an animal. The application of a first force to the free end of the flexible cord causes a portion of the flexible cord to unwind from the spool. The remainder of the flexible cord is prevented from unwinding from the spool unless a second force is applied to the free end of the flexible cord where the second force is greater than the first force.

U.S. Pat. No. 6,405,683 to Walter, et al. discloses a leash handle having a spool rotatably mounted in a housing, a trigger, and a dual-position switch. The trigger is operated to prevent the leash cord from extending or retracting, and released to enable the leash cord to extend out of the housing in response to an external force. The spooling assembly is spring biased to cause the leash cord to retract in the absence of trigger actuation and the presence of a preset external force.

U.S. Pat. No. 6,073,875 to Paugh discloses a retraction unit for keys and the like having a housing with a reel mounted in the housing for rotation, a retraction spring for the reel, and a cable carried on the reel, with the inner end of the cable connected to the reel, and a cable end fitting carried on the outer end of the cable where the fitting has an inner end, a central portion and an outer end, with the central portion of a lesser cross section than the inner and outer ends.

SUMMARY OF THE INVENTION

In an exemplary embodiment of the present invention, there is disclosed a retraction apparatus for a flexible member, where the retraction apparatus has a housing with a reel mounted in the housing for rotation, a rewinding spring coupled to the housing and the reel, and the flexible member has an inner end and an outer end where the flexible member is wound around the reel with the inner end being connected to the reel and the outer end being unattached or attached to a writing instrument or other item, the improvement comprising:

tracks located on a side surface of the reel,
a track arm having an outer end and an inner end, the inner end being pivotally coupled to an elevation post; and
an arm post attached to the outer end of the track arm for engaging the tracks on the side surface of the reel;
wherein the inner end of the track arm can be raised or lowered to provide a no tension mode of operation or a tension mode of operation.

It is an object of the invention is to provide a means of interrupting the retracting force of the spring loaded spool and re-engaging the retracting force of the spool with a one handed operation on the flexible member without requiring a switch to stop the retracting force or to engage it.

It is an object of the invention to provide a user with a mechanical means of controlling amount of force required to start or stop rotation of the spool.

It is an object of the invention is to permit the user to allow the spool—and its biasing spring member to continuously apply a rewinding force to the flexible member.

It is an object of the invention is to allow the user to select a mode that will interrupt the pulling force and allow the flexible member to relax, and then allow the user to pull slightly on the flexible member and cause the rewind spool to start applying a retracting force.

It is an object of the invention to construct a track that rotates synchronously with a rewind spool as the rewind spool is rotated by the pulling force on the flexible member or as the rewind spool is rotated by the inward force of the rewind spring.

It is an object of the invention to construct an arm that is pivotally mounted on a pin and has an arm-post which is a part of the arm that engages a track as the track rotates so that the track predominately causes the arm-post to substantially follow the prescribed path of the track.

It is an object of the invention to use the shape of the track to substantially engage the arm-post to cause the arm to pivot as the arm-post follows the direction of the track.

It is an object of the invention to shape the tracks with elevation changes to affect the movement of the post-arm and to capture and secure the arm-post when needed to stop the rotation of the spool.

An object of the invention is that when the post-arm is captured in a designed place such as a latch-position in the track, the post-arm applies a force that counteracts the rewind force of the spring and causes the rewind spool to stop its rotation and stop the pulling forces on the flexible member.

It is an object of the invention to shape the track so that it can guide the arm-post in both the rewind and opposite rotation.

It is an object of the invention to apply a biasing force to the arm-post using a switch-locking-track-lever and lever-rib to insure engagement with the path of the tracks and the elevation levels of the path.

It is an object of the invention to use a secondary lever-rib in conjunction with the primary locking-lever-switch to further apply or alleviate the forces on the post and arm.

It is an object of the invention to alleviate tension on the flexible member so that the user can manipulate the flexible member or an object connected to the end of the flexible member without the user having to contend with the rewind force.

It is an object of the invention to secure an object to the end of the flexible member such as a holder for a writing instrument, tool, badge, utensil or other item useful to the user.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
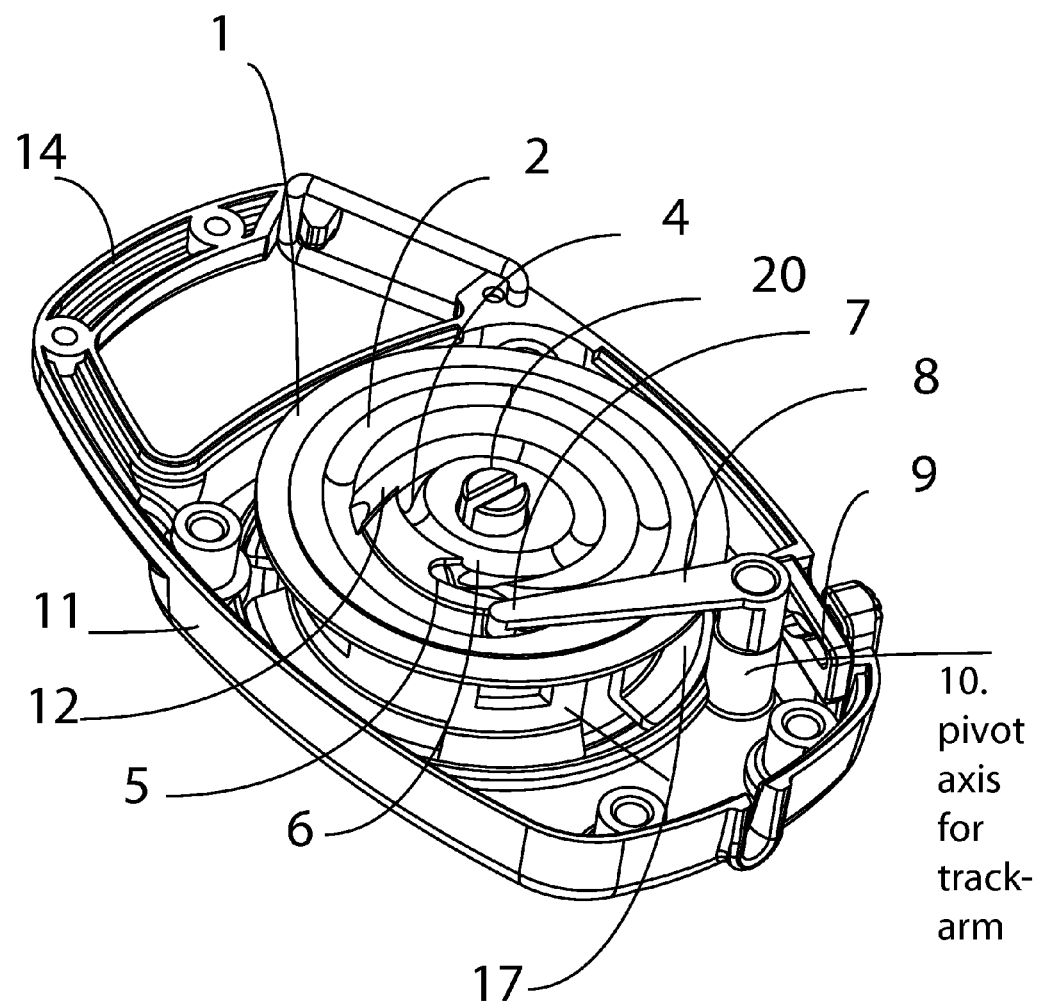
FIG. 1 is a perspective view of a spring loaded rewind mechanism for a flexible member with the top cover removed in accordance with the principles of the invention.

Referring to FIG. 1-5, the main elements of the invention and a description of their functions are as follows:

Housing 11, Bottom Half:

The bottom half of the housing 11 provides support for the spool 1, arm 8, switch, switch-locking-track-lever 9 and tracks, and provides a protection to the components. The housing also provides the outward appearance and support for functional attachments such as a slide belt clip and carabiner hook 14. The housing is attached to one end of a spiral power spring and includes a "lever-rib" that enhances the downward force on the arm-post 7 at critical times in order to insure that the arm-post 7 engages the track.

Spool:

The spool, 1 is configured to be captured within the housing so that the spool is free to rotate. The spool holds one end of the biasing member such as a spiral power spring, or a spring and is configured to be attached to one end of a flexible member 17. As the flexible member 17 is pulled out of the housing by the user, the spool 1 winds against the inward pull of the biasing member, thus storing energy that will be released when the user releases his/her pulling force.

Figure 2:
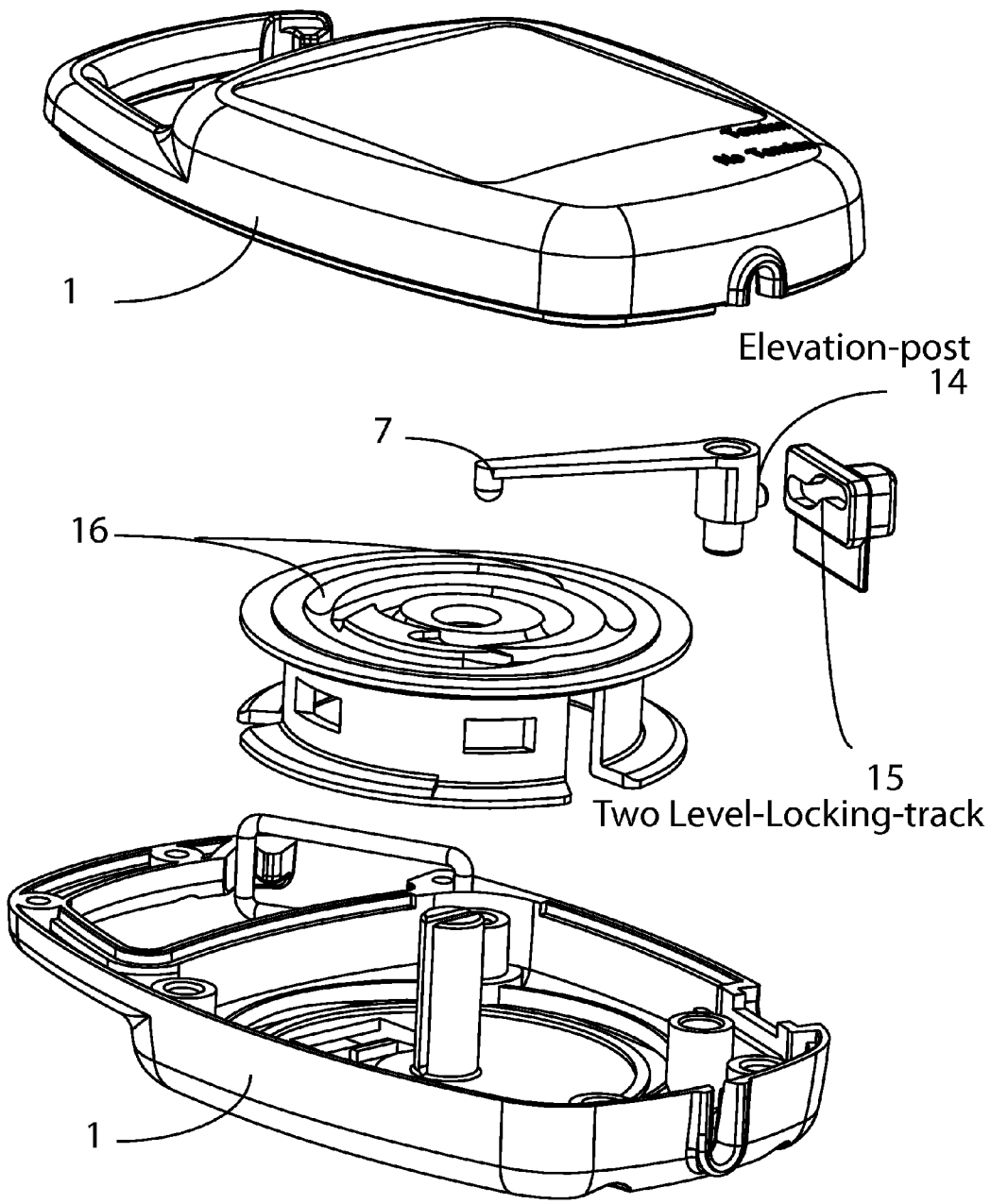
FIG. 2 is an exploded perspective view of the spring loaded rewind mechanism for a flexible member of FIG. 1.
Figure 3:
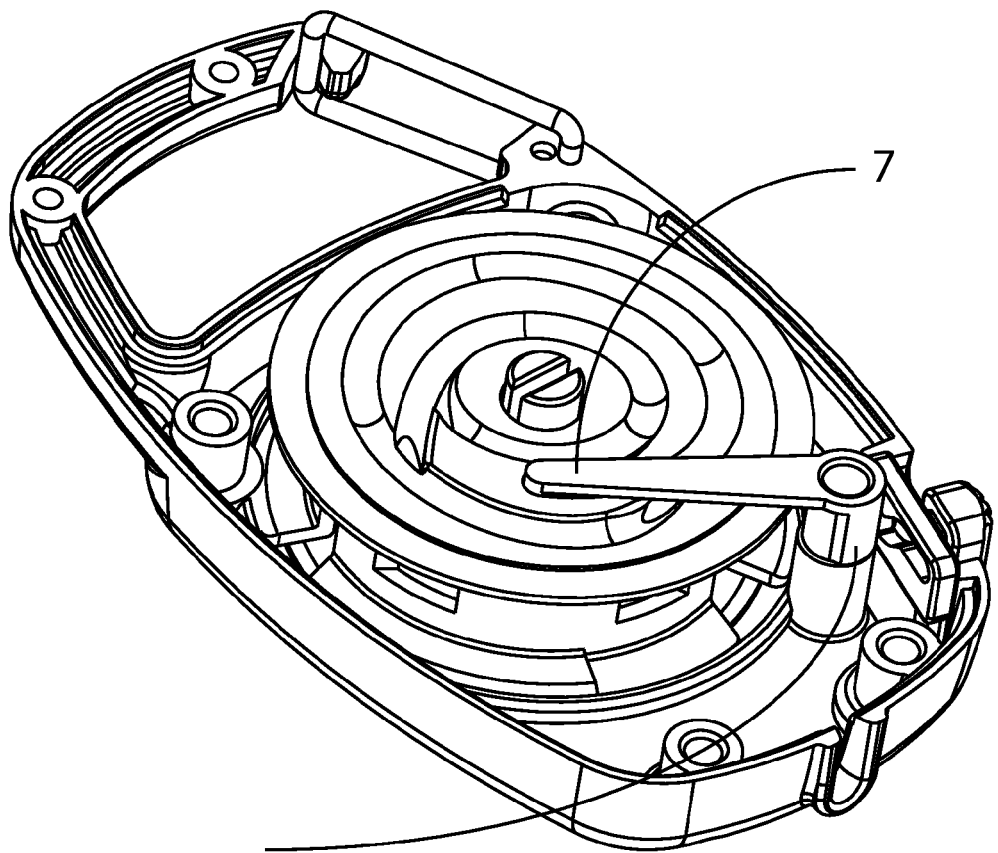
FIG. 3 is a perspective view of a spring loaded rewind mechanism for a flexible member with the top cover removed showing the arm post captured in latch position of the spool track and the track arm lowered in no tension mode.
Figure 4:
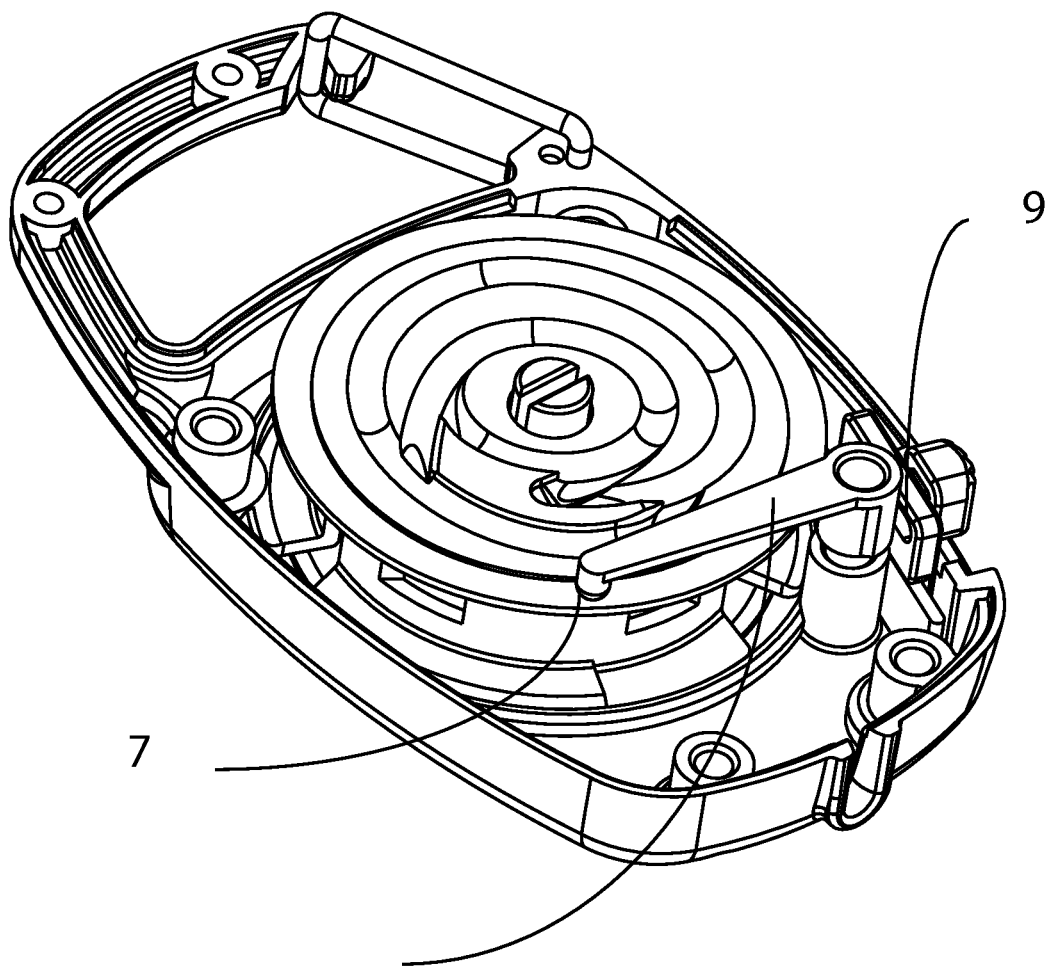
FIG. 4 is a perspective view of a spring loaded rewind mechanism for a flexible member with the top cover removed showing the arm post tgghe outer track when in the tension mode and the track arm raise by the switch locking lever.
Figure 5:
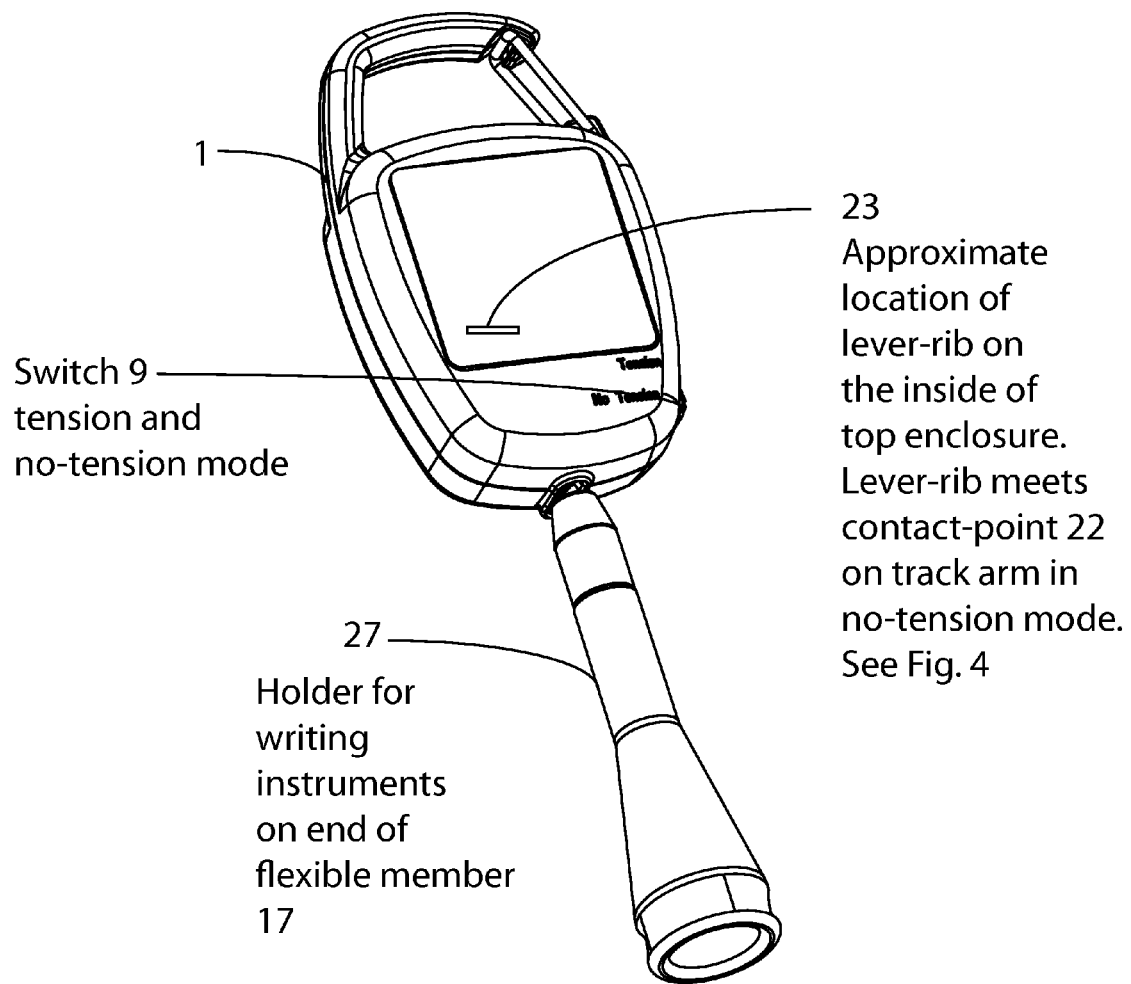
FIG. 5 is a perspective view of a device for rewinding a flexible member attached to a writing instrument in accordance with the principles of the invention.

Track:

The tracks, 16, see FIG. 2, are shaped to best engage the shape of the arm-post 7 in order to maximally apply forces to move the arm-post 7 in the desired direction. The tracks can be a separate component mounted on the top of the spool 1, or molded as an integral part of the spool 1, or be joined separately, as long as it is positioned to accept the arm-post 7 and to rotate synchronously with the spool.

As the spool 1 rotates, features of the track apply forces that move the arm-post 7 in directions dictated by the directional rotation of the spool 1. In addition, a desired downward force can direct the arm-post 7 to engage with elevation changes in the track. These elevation changes are important in guiding the arm-post 7. For example, an important section of the track is the "latch-position5". This location is configured and shaped in such a way to insure that the arm-post 7 is captured at the right moment. The post 7 is guided into and out of this latch-position 5 using strategically placed and shaped tracks 16 and elevation changes.

There is a substantial Inner-track 6 and Outer-track 2.

When desired, with the switch in the No-Tension mode, the shape and elevation levels in the outer-track 2 guide the arm-post 7 from the outer-track 2 and into the critical latch-position 5: This can only happen when the track is rotating in a certain direction such as in the direction of the spring-rewind force. When the arm-post 7 is in this latch-position 5, it is captured substantially by the rewind/retraction force of spool 1 and the shape of the track in this position. The arm-post 7 applies the stopping force that prevents the spool from rotating in the retraction direction. The flexible member will relax.

With the arm-post 7 secure in the latch-position, 5—when the user tugs on the flexible member 17, the arm-post 7 is guided out of the latch-position 5 (because of the track shape and elevation changes), to the inner-track 6, and then, when the user immediately releases his force, the spool 1 moves in the rewind/retraction direction. As it rotates in this direction, the shape of the path and elevation changes have little influence on the post and vice-versa: so the rewind forces of the spool allow the spool to retract.

When the post is in this inner-track 6, and the user pulls on the string causing the spool to rotate in the opposite direction to rewind, another critical path is engaged—one that moves the arm-post 7 from the inner to the outer-track 2. This inner-outer transition area 12 of track 6 is determined by the shape and elevation changes on the spool. As the user pulls the flexible member, the arm-post 7 is guided into this inner-outer transition 12 track and the arm-post 7 moves to the outside track.

Tracking Arm:

The track-arm 8 can have different styles and shapes. A key feature of the track-arm 8 is the part that engages with the track, and is referred to as the arm-post 7, see FIGS. 1-4. In this embodiment the arm is engaged with a base that is in turn mounted on pins which allows the arm to pivot around the pin pivot axis. The arm-post 7 is perpendicular to the arm, directed at the tracks 16, and located near the outer part of the arm. The pivot axis of the arm can also slide up and down perpendicular to the plane of the pivot. This allows the arm-post 7 to be moved closer or further from the surface of the track by use of the switch-locking-track-lever 9. An elevation-post on the base of the arm engages a switch-locking-track-lever 9—it is the switch-locking-track-lever 9 combination that raises and lowers the arm and moved the arm-post 7 closer or further from the tracks 16, see FIG. 1-4.

Switch-Locking-Track-Lever:

The function of the switch-locking-track-lever 9 is to allow two modes of operation: the No-tension mode (also called tug-n-back mode) and the Tension mode (also called Pencil Pull mode).

The switch-locking-track-lever 9 combination raises and lowers the arm, so that the arm-post 7 either engages (no-tension mode) with the track's features or disengages (tension-mode) with the track's features.

The inner part of the switch has a two level locking-track that engages with the "elevation-post" on the base of the arm. At each level of locking-track, the arm is allowed to pivot when the arm-post 7 is moved by the track. When the switch is moved into the tension-mode, the elevation-post on the base of the arm follows that locking-track and the entire arm is raised so that the arm-post 7 is moved substantially away from the tracks 16 on the spool which causes disengagement between the arm-post 7 and the track.

As the arm is raised, a part of the arm is pushed against a innovative lever-rib (not shown) on the inner surface of the top housing. As it pushes on this lever-rib, a additional downward force is applied to the arm-post 7 and this further insures that the post engages with the features the track.

As the post-arm 7 approaches the outer-track 2, the arm slides off this lever-rib and the arm/post is forced to its most elevated position which is substantially away from the track. In this position, arm-post 7 has little influence on the track features and the spool can move freely under the influence of the user's force on the flexible member 17 or the spool will move as a result of the spring energy that applies an inward pulling/rewind force on the spool and hence on the flexible member.

When the switch is slid in the direction of the No-tension mode, the elevation-post on the arm's base that is engaged with the locking-track causes the arm to lower and causes the arm-post 7 to strongly engage with the track and then the arm-post 7 will follow the tracks 16 and elevations. Because the arm is substantially lower in this mode, the arm can move and pivot beneath the lever-rib and enter the latch-position 5. At times, the lever-rib and switch action combination will create further downward pressure on the arm—insuring that the post follows the tracks 16.

Flexible Member:

The flexible member 17 can be a string, tape measure, ribbon, cord, tubing, hose, cable etc. It is connected to the spool at the drum 17, then wound around the spool and exits the enclosure 11. When pulled, this flexible member causes the Spring/biasing element to store energy—energy that when released, causes the flexible member 17 to be rewound around the spool. A pulling or tugging action on the flexible member is the action that triggers the rotation of the spool and tracks 16 and causes the ensuing movement of the arm-post.

Biasing Element (not shown):

Typically a power spring having one end attached to the center post 20/axis of the spool and the other end attached to the spool drum. When the flexible member is pulled/extended from the enclosure, it causes the power spring to wind around this axis and stores energy. When the pulling force is released from the flexible member, the spring causes the spool to rewind, which winds the flexible member around the spool.

Alternate Embodiments

In an embodiment the arm can be mounted on one solid perpendicular post rather than in sections as disclosed above.

In an embodiment the track shape and elevation changes can be designed so that the arm-post 7 either applies force or reacts to forces depending on the rotation of the spool. For example, when the arm-post 7 enters the latch-location, the outer end of the arm-post 7 is pushing against the stopping wall. It can be designed so that the inner side of the arm-post 7 is engaged with this stopping wall. This can be done by changing the direction of the spring forces on the spool rotation and/or the orientation of the arm to the spool.

In an embodiment the arm can be a metal or other spring material such as a molded plastic with flexibility characteristics that can be adjusted. These characteristics apply critical amounts of forces to take advantage of the elevation changes in the tracks 16 and against the sides of the track.

In another embodiment the lever-lock-switch can be oriented differently to the arm.

The arm can be oriented perpendicular to the reel. Then the force of a post against the tracks 16 will be oriented accordingly and other forces and can be oriented to apply pressure against the tracks 16.

In another embodiment the track can be physically separated from the spool but connected to the spool by means of a belt or gears. The track would still rotate synchronously with the spool.

In another embodiment the arm can be mounted to other locations in the housing.

In another embodiment the switch can have indents requiring another object to move it—rather than by a finger.

In another embodiment the end of the flexible member can be one of a wide range of metals or molded plastics with functional use or decorative/advertising use.

In another embodiment the arm base can be mounted on a ramp or other lever—similar to a click pen.

In another embodiment the spool can be mounted in such a way so that it is moved closer to a pivoting arm or arm-post 7 that may or may not be fixed.

In another embodiment the lever-rib may be located on top of the tracking arm. This rib configuration would then mate with an indention on the top enclosure when the tracking arm is stored in no-tension mode.

Operation:

There are two modes of operation which can be chosen by a user:

A. The Tension-mode (the tension/inward-rewind force is continuously applied to the flexible member by the rewind spring and is controlled to be on or off, by an outward pulling force on the flexible member; and B. The No-Tension mode.

No-Tension-Mode Operation

With the flexible member fully retracted and the switch-locking-track-lever 9 in No-Tension mode, the switch-locking-track-lever 9 causes the arm-post 7 to apply pressure to the track, which causes the arm-post 7 to substantially follow the elevation levels and other track features when dictated by the rotational direction of the spool.

The user, or other entity, pulls on the free end or other part of the flexible member, and withdraws the flexible member out to a desired distance. No matter the location of the arm-post 7 at this time, the arm-post 7 is forced to the outer-track 2 by the rotation of the spool and the features of the track. As the spool continues to rotate in this direction—the arm-post 7 will stay in that outer-track 2.

The user releases his pulling force and the spool starts to retract due to the inward-rewind force of the spool spring.

As the spool retracts, the arm-post 7 follows the track because of the unique shape and elevation changes of the outside-track. The arm-post 7 is eventually guided into the latch-position 5. The arm-post 7 firmly contacts the stopping wall/detent in the latch-position 5 and this interaction stops the rotation of the spool and hence, the flexible member is tension free. The user can easily manipulate the flexible member or attached item.

The user gives an outward "tug" or pull on the flexible member, in opposition of the inward-spring force, on the flexible member. The spool is forced to rotate and as it does, the arm-post 7 moves away from the stopping wall and the arm-post 7 must now follow the unique exit path and elevation change and the arm-post 7 moves to the inside track. The design of the entry and exit tracks 16 and elevations of the latch-position 5 insure that the arm post can only move in the described direction—it cannot move backwards to the outer-track 2 after entering this transition area.

With the arm-post 7 in the inner-track 6 and when the user releases his pull/tug, the spring forces cause the spool to rewind. When the spool rotates in this direction the arm-post 7 is not substantially influenced (because of the shape of the track) and the inward/rewinding force of the spring on the spool will cause complete rewind of the flexible member. Since the post is not influenced by the track when the spool rotates in this direction, the post stays in the inner-track 6.

When the user pulls the string out again, the arm-post 7 then follows the track, and the elevation and shape of the track now forces the post to move through the inner-track 6-to-outer-track 2-inner-outer transition 12 all the way to the outer-track 2. This is helped somewhat by the lever-rib. The user pulls the string to the desired length the process is repeated.

Tension-Mode Operation

Starting with the switch in the Tension mode:

The switch-locking-track-lever 9 raises the arm away from the tracks 16 by moving the arm up toward the ceiling—moving the arm-post 7 away from the tracks 16.

If the arm is in the outer-track 2, it will be kept in that position—over the outer-track 2—by the precisely located ending of the lever-rib on the ceiling. The arm-post 7 will be above the track and the flexible member can be pulled out to any length and when the user/other forces stop pulling on the flexible member, the rewind forces will pull the flexible member and cause it to rewind around the spool.

If the user moves the switch to Tension-mode when the arm is under the lever-rib (the arm-post 7 will be either in the latch-position 5 or in the inner-track 6 or in one of those transition areas). The lever-rib applies a force to the arm and the arm-post 7 is pressed against the track—engaging the arm-post 7 to the track—and when the user pulls the flexible member, the post follows the elevation and shape of the track all the way to the outer-track 2 position.

When the arm reaches the outer-track 2 position, the arm snaps away from the track and towards the ceiling (because of the upward pressure on the flexible arm that is applied by the switch-locking-track-lever 9). From that position, the spool will again be un-encumbered and the spool will be under the influence of the user's pulling force or the spring's inward force.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A retraction apparatus for a flexible member, the retraction apparatus having a housing with a reel mounted in the housing for rotation, a rewinding spring coupled to the housing and the reel, and the flexible member has an inner end and an outer end where the flexible member is wound around the reel with the inner end being connected to the reel and the outer end being unattached or attached to a writing instrument or other item, the improvement comprising:
   tracks located on a side surface of the reel,
   a track arm having an outer end and an inner end, the inner end being pivotally coupled to an elevation post; and
   an arm post attached to the outer end of the track arm for engaging the tracks on the side surface of the reel;
   wherein the inner end of the track arm can be raised or lowered to provide a no tension mode of operation or a tension mode of operation; the arm post is perpendicular to the track arm; and the elevation post is coupled to a switch locking track lever which raises or lowers the track arm.

2. The apparatus of claim 1 wherein the switch has a two level locking track that engages with the elevation post.

3. The apparatus of claim 2 wherein at each two level of locking track the arm is allowed to pivot when the arm post is moved by the track.

4. The apparatus of claim 3 wherein the switch locking track lever can be moved to provide the tension mode of operation and the no tension mode of operation.

5. The apparatus of claim 4 wherein the tracks located on a side surface of the reel are a separate component.

6. The apparatus of claim 4 wherein the tracks located on a side surface of the reel are molded as an integral part of the reel.

7. The apparatus of claim 4 wherein the tracks located on a side surface of the reel have elevation variations.

8. The apparatus of claim 1 wherein the arm post moves away from and is disengaged from the tracks when the track arm is raised.

9. A method of retracting a flexible member onto a reel mounted in a housing for rotation, where a rewinding spring is coupled to the housing and the reel, and the flexible member is wound around the reel with an inner end of the flexible member being connected to the reel and the outer end being unattached or attached to a writing instrument or other item, the improvement comprises:
locating tracks on a side surface of the reel,
providing a track arm having an outer end and an inner end, the inner end being pivotally coupled to an elevation post; and
attaching an arm post to the outer end of the track arm for engaging the tracks on the side surface of the reel;
wherein the inner end of the track arm can be raised or lowered to provide a no tension mode of operation or a tension mode of operation; the arm post is perpendicular to the track arm; and the elevation post is coupled to a switch locking track lever which raises or lowers the track arm.

10. The method of claim 9 wherein the switch has a two level locking track that engages with the elevation post.

11. The method of claim 10 wherein at each two level of locking track the arm is allowed to pivot when the arm post is moved by the track.

12. The method of claim 11 wherein the switch locking track lever can be moved to provide the tension mode of operation and the no tension mode of operation.

13. The method of claim 12 wherein the tracks located on a side surface of the reel are a separate component.

14. The method of claim 12 wherein the tracks located on a side surface of the reel are molded as an integral part of the reel.

15. The method of claim 12 wherein the tracks located on a side surface of the reel have elevation variations.

16. The method of claim 9 wherein the arm post moves away from and is disengaged from the tracks when the track arm is raised.

* * * * *